United States Patent [19]
Beugelsdyk et al.

[11] Patent Number: 5,038,452

[45] Date of Patent: Aug. 13, 1991

[54] METHOD OF ASSEMBLING AN IMPROVED RATCHETING TOOL DRIVER

[75] Inventors: Anthony F. Beugelsdyk, Wichita, Kans.; Chun-Hsiung Lin, Taichung; Lester C. Wu, Taipei, both of Taiwan

[73] Assignee: Latshaw Enterprises, Inc., Wichita, Kans.

[21] Appl. No.: 422,894

[22] Filed: Oct. 18, 1989

Related U.S. Application Data

[60] Division of Ser. No. 248,182, Sep. 23, 1988, Pat. No. 4,901,607, which is a continuation-in-part of Ser. No. 149,486. Jan. 28, 1988, Pat. No. 4,793,222.

[51] Int. Cl.[5] .............................................. B23P 11/00

[52] U.S. Cl. .......................................... 29/436; 29/469

[58] Field of Search ................. 74/578; 81/29, 30, 31, 81/33, 63.1; 192/43.2; 29/436, 469

[56] References Cited

U.S. PATENT DOCUMENTS

| | | | |
|---|---|---|---|
| 341,986 | 5/1886 | Alapau | 81/58.2 X |
| 1,250,328 | 12/1917 | Langford | 81/177.4 X |
| 1,587,647 | 6/1926 | Hood et al. | 81/177.4 X |
| 2,286,917 | 6/1942 | Mandl | 192/43.2 |
| 3,222,943 | 12/1965 | McDonald | 192/43.2 X |
| 3,262,338 | 7/1966 | Mahall | 29/436 X |
| 3,356,117 | 12/1967 | Wagner | 81/62 X |
| 3,556,184 | 1/1971 | Wagner | 81/451 |
| 3,583,556 | 6/1971 | Wagner | 269/286 X |
| 3,595,592 | 7/1971 | Wagner | 279/50 X |
| 4,170,909 | 10/1979 | Wagner | 81/63.2 |
| 4,735,120 | 4/1988 | Beugelsdyk | 192/43.2 X |
| 4,793,222 | 12/1988 | Beugelsdyk | 192/43.2 X |

*Primary Examiner*—Mark Rosenbaum
*Assistant Examiner*—Frances Chin
*Attorney, Agent, or Firm*—John Wade Carpenter

[57] ABSTRACT

A method of assembling the ratcheting tool driver. A plurality of inwardly facing ratchet teeth is integral with the walls of a cylindrical retainer cavity within the hollow cylindrical retainer. A washer is mounted around the generally conduit head and is sandwiched between an external head flange and an internal retainer flange. A snap ring is positioned in the head recess in order to provide friction for the washer in conjunction with maintaining the retainer around the open end. The ratcheting tool driver includes a generally solid cylindrical switch rod has a first rod end and a second rod end with a rod recess surrounded by a hollow neck. A pawl is provided with a pawl recess. A pawl spring bias is seated in the rod recess and a bearing is disposed against the pawl spring bias and seated in the pawl recess such that when a switch button rotates the switch rod in a predetermined direction the biased bearing forces the pawl to shift within the head slot and engage one of the plurality of inwardly facing the ratchet teeth of the first cylindrical retainer cavity. The pawl is capable of being shifted in opposing directions within the formed head slot in accordance with the predetermined rotation of the switch rod. The shift of the pawl from one side and its engagement with the ratchet teeth prevents a rotation of the retainer in one direction as during application of a force simultaneously with freely providing a reverse turn of said retainer in preparation for the exertion of additional force in the prevented direction. A shifting of the pawl to the one side of the head slot and its engagement thereat with the ratchet teeth precludes a rotation of the retainer in an opposite direction while freely providing a reverse turn of the retainer.

19 Claims, 7 Drawing Sheets

FIG. 21
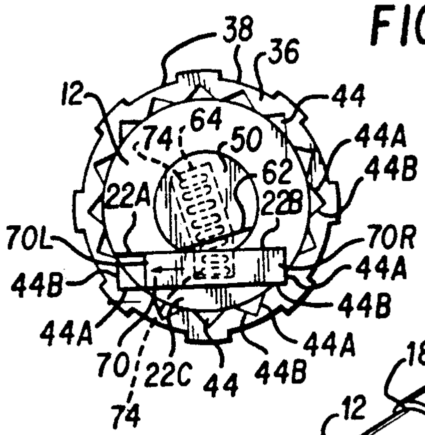
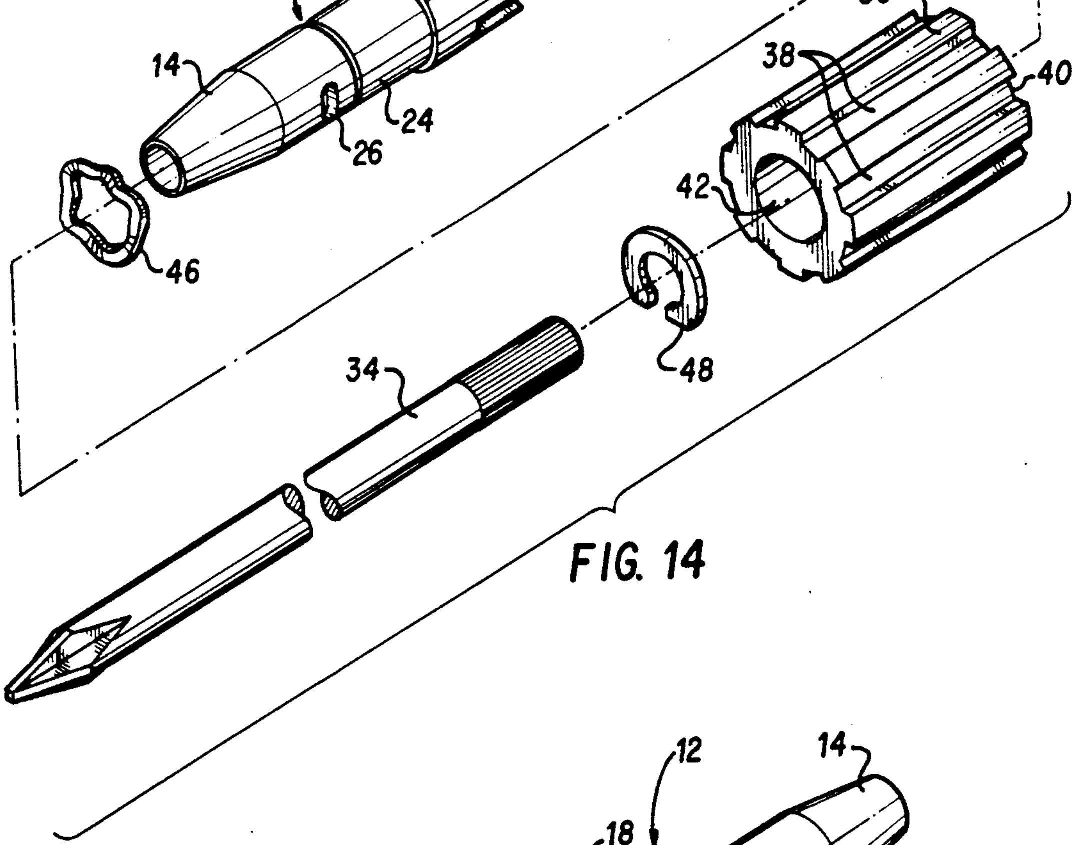
FIG. 14
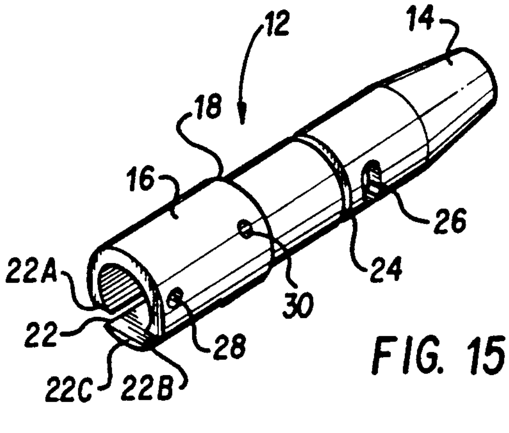
FIG. 15

METHOD OF ASSEMBLING AN IMPROVED RATCHETING TOOL DRIVER

This is a divisional application of copending application Ser. No. 07/248,182 filed Sept. 23, 1988, now U.S. Pat. No. , 4,901,607, which is a continuation-in-part of application Ser. No. 07/149,486 filed Jan. 28, 1988, now U.S. Pat. No. 4,793,222.

BACKGROUND OF THE INVENTION

1. Field of the Invention

This invention provides a ratcheting tool driver. More specifically, this invention contemplates a novel ratcheting driver for a tool and a novel method of assembling a ratcheting driver for a tool.

2. Description of the Prior Art

British Patent No. 661,043 by Griffin teaches a gear-type ratchet mechanism including inwardly facing teeth engaging a double-ended slideable pawl mounted in a slot or a recess. When the pawl slides one way there is provided clockwise engagement of the pawl to the teeth, and when the pawl slides the other way there is provided a counter clockwise engagement of the pawl to the teeth U.S. Pat. No. 4,170,909 by Wagner is similar to Griffin except that the Wagner design offers a pivoting element incorporating the handle into the socket control. Other U.S. Pat. Nos. by Wagner are as follows: 3,356,117; 3,556,184; 3,583,556; 3,595,105; 3,595,592; and 4,170,909. U.S. Pat. No. 341,986 by Alapaw discloses a socket-ratchet wrench. U.S. Pat. No. 1,250,328 by Langford teaches a screw driver. U.S. Pat. No. 1,587,647 by Hood et al provides for a magnetic hand tool. None of the foregoing prior art teach or suggest the particular ratcheting tool driver and method for assembling the same of this invention.

SUMMARY OF THE INVENTION

This invention accomplishes its desired objects by providing a ratcheting tool driver comprising a generally conduit head means having an open first end to accomodate a tool and an open second end that includes a structure defining an external head flange, an internal head flange, and a head slot which is open on its sides. The conduit head means additionally has a structure including a head recess, a head opening, a loading hole in the open second end, and a pair of detent holes or a pair of internal channels in the open second end. A hollow cylindrical retainer means has an external structure defining a plurality of flutes and an internal structure defining a first cylindrical retainer cavity, a second cylindrical retainer cavity in communication with said first cylindrical retainer cavity and having a smaller diameter than said first cylindrical cavity, and an internal retainer flange that represents the termination point of the first cylindrical retainer cavity and the commencement point of the second cylindrical retainer cavity and the dividing point between the first and the second cylindrical retainer cavity. The retainer means is rotatably positioned around the open second end from the beginning of the open second end to the head recess and such that the external head flange rotatably mates with the internal retainer flange. A plurality of inwardly facing ratchet teeth means is integral with the walls of the first cylindrical retainer cavity. A washer means is mounted around the generally conduit head means and is sandwiched between the external head flange and the internal retainer flange. A snap ring means is positioned in the head recess in order to provide friction for the washer means in conjunction with maintaining the retainer means around the open second end. A generally solid cylindrical switch rod means has a first rod end and a second rod end and includes a rod flange integral with outside of the first rod end, a first cylindrical rod hole piercing the first rod end in proximity to the rod flange, and a second cylindrical rod hole piercing the second end. The first rod end has a structure defining a channeled side which includes a rod recess therein. Formed around the rod recess is a hollow neck. The first cylindrical rod hole has a central axis that is generally parallel with a plane of the face of the channeled side and the switch rod means is rotatably positioned within the conduit head means such that the channeled side of the first rod end of the switch rod means faces and opposes the head slot. The head opening generally registers with the second cylindrical rod hole. If the conduit head means includes the pair of detent holes, the first cylindrical rod hole is essentially circumferentially aligned with the pair of detent holes.

A pawl means having a structure defining a pawl recess is slidably lodged within the head slot such that said pawl recess generally registers with the rod recess and the hollow neck of the first rod end of the switch rod means. A rod retention spring bias means and a pair of ball means on opposed sides thereof are slidably positioned in the first cylindrical rod hole wherein the pair of ball means are biased against the internal wall of the open second end such that when the switch rod means is rotated in one predetermined direction one of said pair of ball means removably lodges in one of said pair of detent holes or in one of the internal channels; and when the switch rod means is rotated in the reverse of the predetermined direction, the lodged ball means becomes dislodged from one of the detent holes on the internal channels. With continuing rotation of the switch rod means the other opposed remaining ball means becomes lodged in the other opposed remaining detent hole of said pair of detent holes or in the other opposed remaining internal channel.

A switch button means is seated in the second cylindrical rod hole and extends through the head opening of the head means in order to rotate the switch rod means about its central axis within the head means in a predetermined direction. A pawl spring bias means is seated in the rod recess and a bearing is seated over an end of the pawl spring and biased into the pawl recess such that when the switch button means rotates the switch rod means in a predetermined direction the biased bearing forces the pawl means to shift within the head slot and engage one of the plurality of inwardly facing ratchet teeth of the first cylindrical retainer cavity. The pawl means is capable of being shifted in opposing directions within the formed head slot in accordance with the predetermined rotation of the switch rod means. The shift of the pawl means from one side and its engagement with the ratchet teeth prevents a rotation of the retainer means in one direction as during application of a force simultaneously freely providing a reverse turn of said retainer means in preparation for exertion of additional force in the prevented direction. A shifting of the pawl means to the other side of the head slot and its engagement thereat with the ratchet teeth precludes a rotation of the retainer means in an opposite direction while freely providing a reverse turn of the retainer means.

This invention also accomplishes its desired objects by providing a method of assembling a ratcheting tool driver comprising the steps of:

(a) forming a generally conduit head means with a head recess and a head opening and with an open first end to accomodate a tool and with an open second end that includes an external head flange, an internal head flange, a head slot which is open on its sides, a loading hole and a pair of detent holes, or a pair of internal channels;

(b) sliding through the open second end a switch rod means having a first cylindrical rod hole, a second cylindrical rod hole, a channeled side with a rod recess therein having a hollow neck formed therearound, until said first cylindrical rod hole collimates with the loading hole;

(c) slipping through the loading hole a rod retention spring bias means with a pair of ball means on opposed sides thereof until the rod retention spring bias means and the pair of opposed position ball means are seated into the second cylindrical rod hole;

(d) sliding further the switch rod means until the pair of ball means are biased by the rod retention spring bias means agains the internal wall of the open second end of the conduit head means;

(e) seating a pawl spring bias means through the hollow neck and in the rod recess of the channeled side of the switch rod means, and further seating a bearing against an end of the pawl spring bias means and subsequently positioning the bearing in a pawl recess of a pawl means;

(f) pressing the pawl means toward the channeled side in order to compress the pawl spring bias means and the seated bearing simultaneously with continuing to slide the switch rod means through the open second end until the second cylindrical rod hole collimates with the head opening and until the pawl means slidably lodges within the head slot;

(g) flushing circumferentially a washer means against the internal head flange;

(h) positioning rotatably a hollow cylindrical retainer means with a plurality of inwardly facing ratchet teeth and an internal retainer flange around the open second end of the generally conduit head means from the beginning of the open second end to the head recess and such that the washer means is rotatably sandwiched by the external head flange and the internal retainer flange;

(i) providing friction to the washer means of step (h) in conjunction with maintaining the retainer means around the open second end by positioning a snap ring means in said head recess; and (j) setting a switch button means in the second cylindrical rod hole and extending through the head opening of the head means in order to rotate the switch rod means about its central axis within the head means in a predetermined direction.

It is an object of the invention to provide an improved ratcheting driver for a tool.

Still further objects of the invention reside in the provision of a method of easily assembling an improved ratcheting driver tool.

These together with the various ancillary objects and features will become apparent as the following description proceeds, are attained by this invention, preferred embodiments being shown in the accompanying drawings, by way of example only, wherein:

BRIEF DESCRIPTION OF THE DRAWINGS

FIG. 14 is an exploded segmented perspective view of the ratcheting tool driver of this invention;

FIG. 15 is a perspective view of the conduit head that includes the pair of detent holes;

FIG. 21 is similar to the view of FIG. 8 and has the pawl shifted to the side of the cylindrical retainer that is opposed to the side of the cylindrical retainer in FIG. 8 engaged by the pawl;

DETAILED DESCRIPTION OF THE INVENTION

Figure 1:
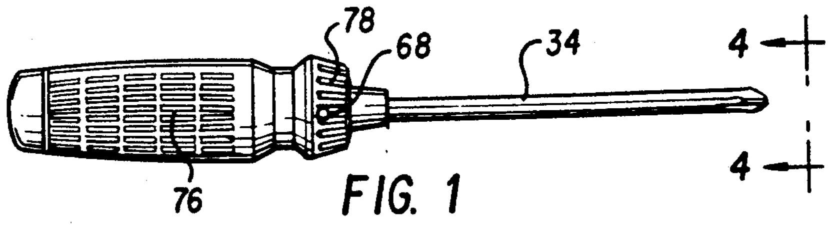
FIG. 1 is a top plan view of the ratcheting tool driver encased in a handle and button cap and having a shaft engaged thereto.
Figure 2:
FIG. 2 is another embodiment of the shaft.
Figure 4:
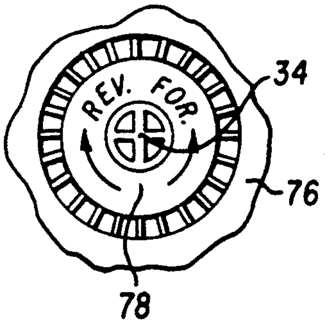
FIG. 4 is a partial front plan view taken in direction of the arrows along the plane of line 4—4 in FIG. 1
Figure 3:
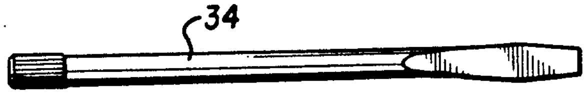
FIG. 3 is yet a third embodiment of the shaft.
Figure 5:
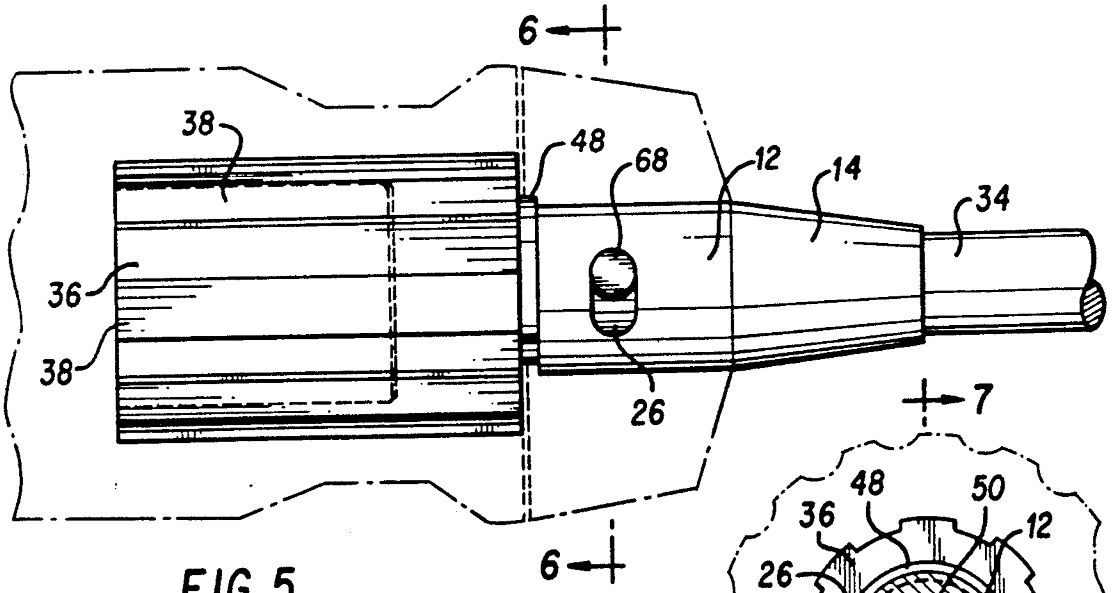
FIG. 5 is a partial enlarged side elevational view disclosing the ratcheting tool driver including the switch button, with the handle and button cap represented by dotted lines.
Figure 6:
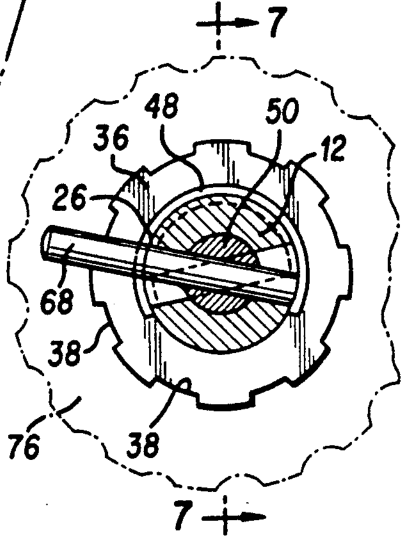
FIG. 6 is a vertical sectional view taken in direction of the arrows and along the plane of line 6—6 in FIG. 5.
Figure 20:
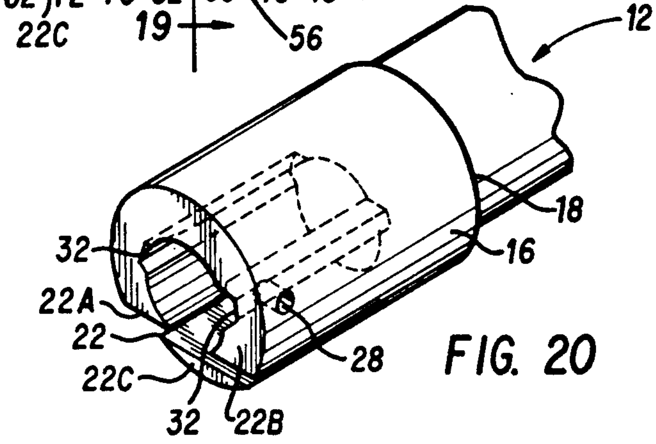
FIG. 20 is a partial enlarged perspective view of one end of the embodiment of the head conduit that includes the pair of internal channels.

Referring in detail now to the drawings, wherein similar parts of the invention are identified by like reference numerals, there is seen the ratcheting tool driver, generally illustrated as 10 (see FIG. 14), of this invention. The ratcheting tool driver 10 has a generally conduit head, generally illustrated as 12 (see FIGS. 15 and 20), which includes an open first end 14 and an open second end 16. The open second end 16 has an external head flange 18, an internal head flange 20 and a head slot, generally illustrated as 22, which is open on its sides, as illustrated in FIGS. 15 and 20, and comprises a slot roof 22A on one side of the slot 22, and a slot roof 22B on the other side of the slot 22, and a slot bottom 22C. The conduit head 12 additionally includes a head recess 24, a head opening 26, and a loading hole 28 in the open second end 16. Conduit head 12 as well as the ratcheting tool driver 10, has two embodiments. In the embodiment of FIG. 15, conduit head 12 has a pair of detent holes 30—30 in the open second end 16. In the embodiment of FIG. 20, conduit head 12 has a pair of internal channels 32—32 instead of the pair of detent holes 30—30. The particular embodiment of the conduit head 12 utilized determines the particular embodiment of the ratcheting tool driver 10. The loading hole 28 has a larger diameter than the diameter of the two detent holes 30—30. The first open end 14 can accommodate a shaft 34 having various end embodiments (see FIGS. 1, 2 and 3) such that the ratcheting tool driver 10 can define a tool (e.g. a screw driver, etc.).

Figure 10:
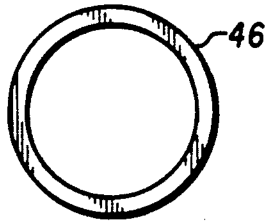
FIG. 10 is a top plan view of the sinusoidal washer.
Figure 11:
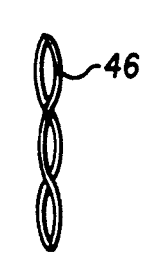
FIG. 11 is a side elevational view of the sinusoidal washer of FIG. 10.
Figure 18:
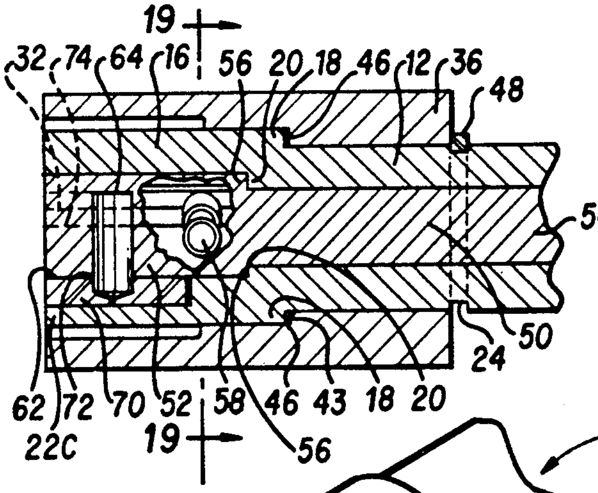
FIG. 18 is a partial vertical sectional view taken in direction of the arrows and along the plane of line 18—18 in FIG. 17.

The ratcheting tool driver 10 additionally includes a hollow cylindrical retainer 36 that has a plurality of flutes 38 on the external structure thereof, and an internal structure defining a first cylindrical cavity 40, a second cylindrical cavity 42 in communication with the first cylindrical cavity 40, and an internal retainer flange 43. The internal retainer flange 43 is the termination point of the first cylindrical retainer cavity 40 and the commencement point of the second cylindrical retainer cavity 42 and the dividing point between the first 40 and the second 42 cylindrical retainer cavity. Integral with the walls of the first cylindrical retainer cavity 40 is a plurality of inwardly facing ratchet teeth 44 (see FIG. 8). Each tooth 44 has a first tooth side 44A and a second tooth side 44B (see FIGS. 8 and 21). The cylindrical retainer 36 is rotatably positioned around the open second end 16 of the conduit head 12 from the beginning of the open second end 16 to the head recess 24 (see FIGS. 7 and 18), such that the external head flange 18 mates with the internal retainer flange 43. A washer 46 (see FIG. 10) is mounted around the generally conduit head 12 and is sandwiched (see FIGS. 7 and 18) between the external head flange 18 and the internal retainer flange 43. In a preferred embodiment of the invention the washer 46 has a sinusoidal structure (see FIGS. 11 and 14).

Figure 13:
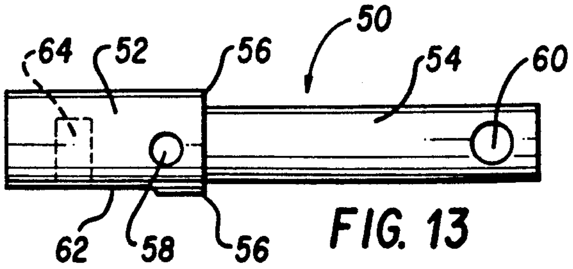
FIG. 13 is a side elevational view of the switch rod with the rod recess represented in dotted lines.
Figure 16:
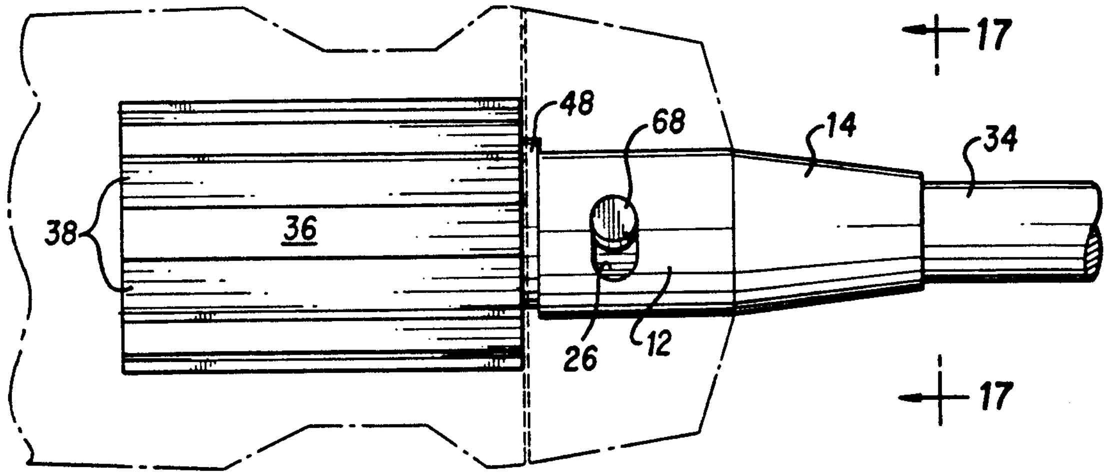
FIG. 16 is a partial enlarged side elevational view of the ratcheting tool driver of this invention utilizing a conduit head with internal channels, and with the handle and button cap represented as dotted line.
Figure 17:
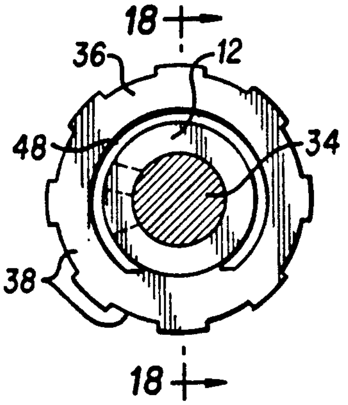
FIG. 17 is a vertical sectional view taken in direction of the arrows and along the plane of line 17—17 in FIG. 16.

Ring 48 is positioned in the head recess 24 in order to provide friction for the washer 46 between the external head flange 18 and the internal retainer flange 43, which prevents "free wheeling" of the retainer 36 about the open second end 16 of the conduit head 12 when a generally solid cylindrical switch rod, generally illustrated as 50 (see FIG. 13), is moved from one predetermined position to another predetermined position, as will be explained in greater detail hereinafter. Ring 48 also assists in maintaining the retainer 36 around the open second end 16.

The switch rod 50 of the ratcheting tool driver 10 has a first rod end 52 and a second rod end 54. A rod flange 56 is integral with the outside of the first rod end 52. Cylindrical rod hole 58 pierces the first rod end 52 in proximity to the rod flange 56, and cylindrical rod hole 60 pierces the second rod end 54. The first rod end 52 has a channeled side 62 with a rod recess 64 therein (see FIGS. 7, 8, 13, 18, and 21). In a preferred embodiment of the present invention as best illustrated in FIGS. 22-26, a hollow neck means, generally illustrated as 100, is formed in or on the channeled side 62. Preferably, neck 100 has a neck top 101 and is formed integral with the channeled side 62 of the switch rod 50. Neck 100 includes a generally cylindrical throat or bore 102 that aligns with the rod recess 64, which is preferably cylindrical in shape. By cylindrical bore 102 being aligned with the cylindrical-shaped rod recess 64, bore 102 and recess 64 are concentric and coaxial with respect to each other. As illustrated in FIGS. 22, 23, 24, and 26, neck 100 protrudes off or away from the channeled side 62. Neck 100 may be of any suitable length such that the neck top 101 is spaced from the channeled side 62, but in a preferred embodiment, neck 100 is from about 0.018 inches to about 0.18 inches in length such that the neck top 101 is disposed or positioned at a distance of from about 0.018 inches to about 0.18 inches from the channeled side 62.

When the switch rod 50 is in a neutral position the cylindrical rod hole 58 has a central axis that is generally parallel with a plane of the face of the channeled side 62. A rod retention spring 65 and a pair of balls 66—66 are slidably positioned in the first cylindrical rod hole 58. The neutral position for the switch rod 50 is defined as that position (see FIG. 9) wherein the pair of balls 66—66 are biased against the internal wall of the open second end 16 of the conduit head 12 and not seated in one of the detent holes 30—30 or in one of the internal channels 32—32. Washer 46, as was previously indicated, is frictionally sandwiched between the external head flange 18 and the internal retainer flange 43 to prevent "free wheeling" of the retainer 36 about the open second end 16 of the conduit head 12 when the switch rod 50 is in the neutral position.

The switch rod 50 is rotatably positioned within the conduit head 12 such that the channeled side 62 of the first rod end 52 faces the slot bottom 22C of the head slot 22, and the head opening 26 generally registers with the second cylindrical rod hole 60. For the head conduit embodiment of FIG. 15, the first rod hole 58 is essentially circumferentially aligned with the pair of detent holes 30—30 of the conduit head 12 in FIG. 15. A switch button 68 is seated in the second cylindrical rod hole 60 and extends through the head opening 26 of the conduit head 12 in order to rotate the switch rod 50 about its central axis within the conduit head 12 in a predetermined direction. When the switch rod 50 is rotated in one predetermined direction, one of the pair of balls 66—66 removably lodges in one of the pair of detent holes 30—30 or in one of the internal channels 32—32. When the switch rod 50 is rotated in the reverse of the predetermined direction, the lodged ball 66 becomes dislodged from one of the detent holes 30 or from one of the internal channels 32. With continuing rotation of the switch rod 50 the other opposed remaining ball 66 of the pair of balls 66—66 becomes lodged in the other opposed remaining detent hole 30 of the pair of detent holes 30—30 or in the opposed remaining internal channel 32 of the pair of internal channels 32—32. The sinusoidal washer 46 that is frictionally lodged or positioned between the external head flange 18 and the internal retainer flange 43 prevents the "free wheeling" of the retainer 36 about the open second end 16 of the conduit head 12 as the switch rod 50 is passing through the neutral position when being moved from one predetermined position to another predetermined position. This is a desirable feature of this invention because it enables the retainer 36 (and/or a handle 76 that is positioned around and engaged to the retainer 36) to be held in one hand while the other hand moves the switch button 68 from one position to another position without the retainer 36 "free wheeling" in the hand holding the same when the switch rod 50 is in or is passing through the neutral position. If the retainer 36 "free wheeled", the switch rod 50 could not be moved out of the neutral position while the retainer 36 is being held.

Figure 22:
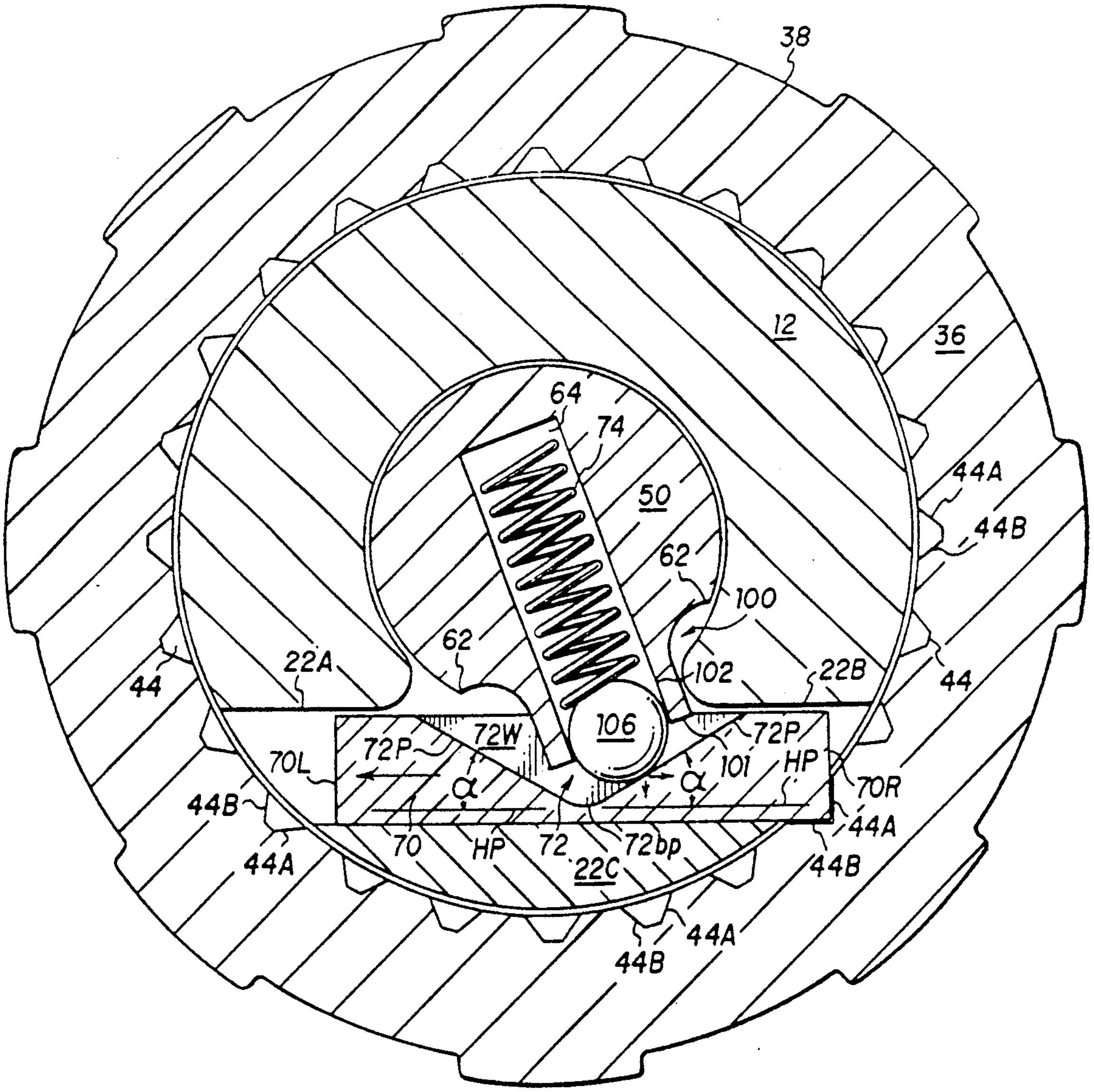
FIG. 22 is a partial vertical sectional view illustrating the pawl spring biasing a .bearing into a pawl recess of a pawl, for another embodiment of the present invention.
Figure 23:
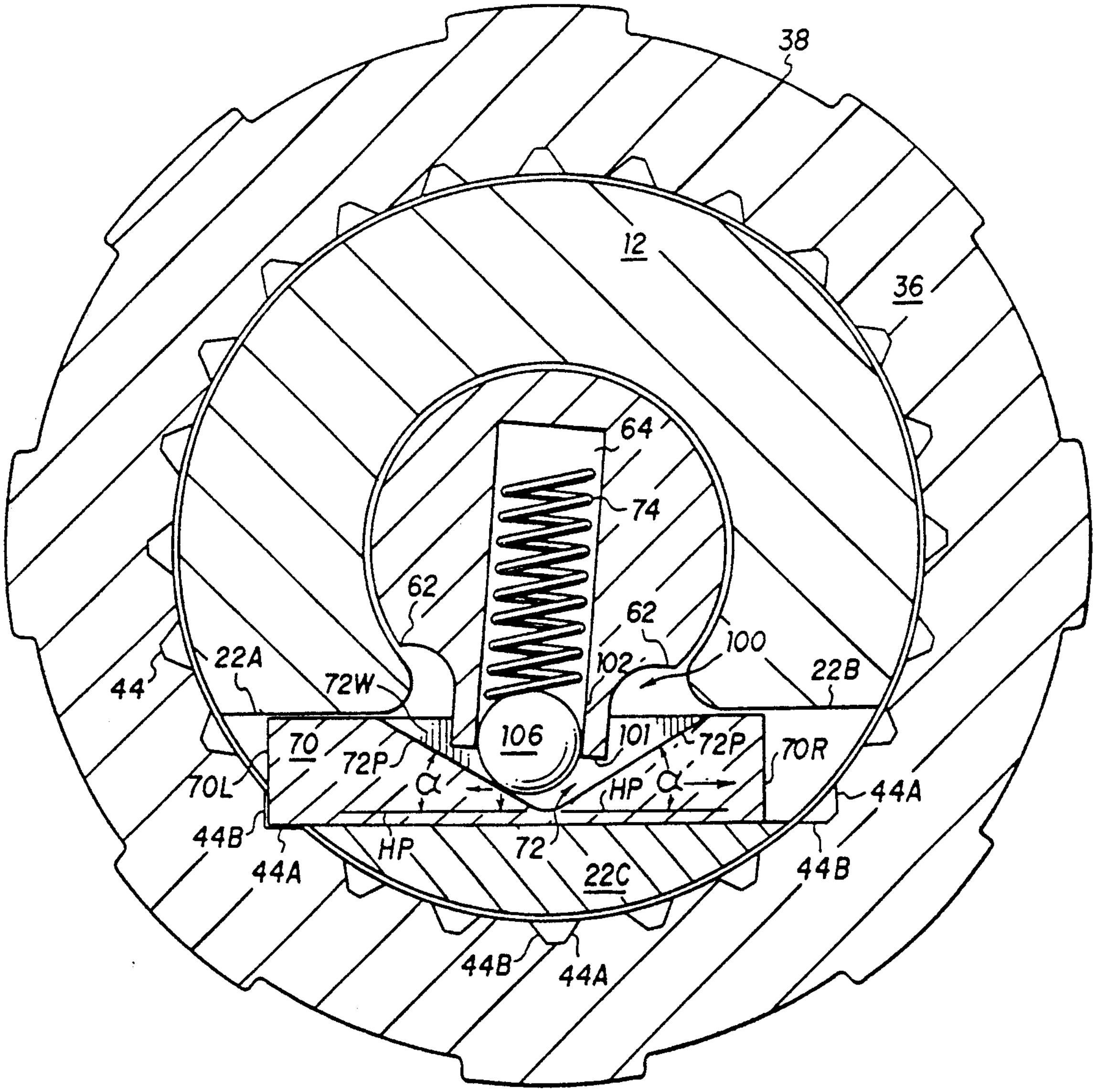
FIG. 23 is a similar view to the view of FIG. 22 and has the pawl shifted to the side of the cylindrical retainer that is opposed to the side of the cylindrical retainer in FIG. 22 engaged by the pawl.
Figure 24:
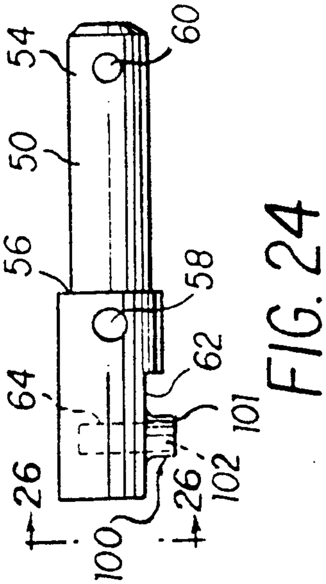
FIG. 24 is a side elevational view of another embodiment of the switch rod having a hollow neck formed over the rod recess.
Figure 25:
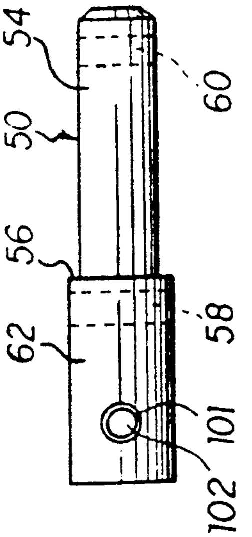
FIG. 25 is a side elevational view of the switch rod of FIG. 24.
Figure 26:
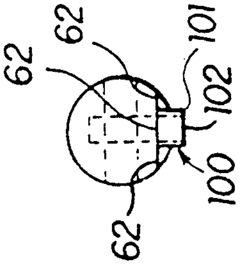
FIG. 26 is an end elevational view of the switch rod in FIG. 24 taken in direction of the arrows and along the plane of line 26—26 in FIG. 24.
Figure 27:
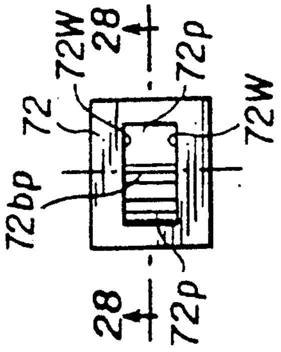
FIG. 27 is a top plan view of another embodiment of the pawl.
Figure 28:
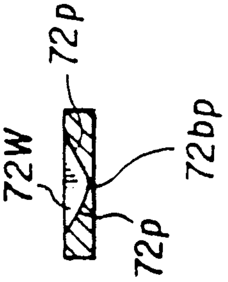
FIG. 28 is a vertical sectional view taken in direction of the arrows and along the plane of line 28—28 in FIG. 27.

A pawl 70 has a pair of end surfaces 70L and 70R and a structure defining a pawl recess 72, and is slidably lodged within the head slot 22 such that the pawl recess 72 generally registers with the rod recess 64 of the first end 52 of the switch rod 50. In FIGS. 22-26, the pawl recess 72 also registers with the bore 102 of the neck 100. In a preferred embodiment of the invention, the pawl recess 72 is defined by a a pair of upright opposed side walls 72W—72W, and a pair of sloping recess pawl walls 72*p*—72*p* that slope and meet at a lowermost recess bottom point 72*bp*. As illustrated in FIGS. 22 and 23, the sloping walls 72*p*—72*p* have an angle $\gamma$ with respect to a horizontal plane HP. Preferably angle $\gamma$ has a value of from about 20° to about 40°; more preferably 25° to about 35°; and most preferably 27° to about 33° In FIG. 28, each of the sloping walls 72*p* is illustrated as having an angle of 30° with respect to horizontal plane HP.

Figure 7:
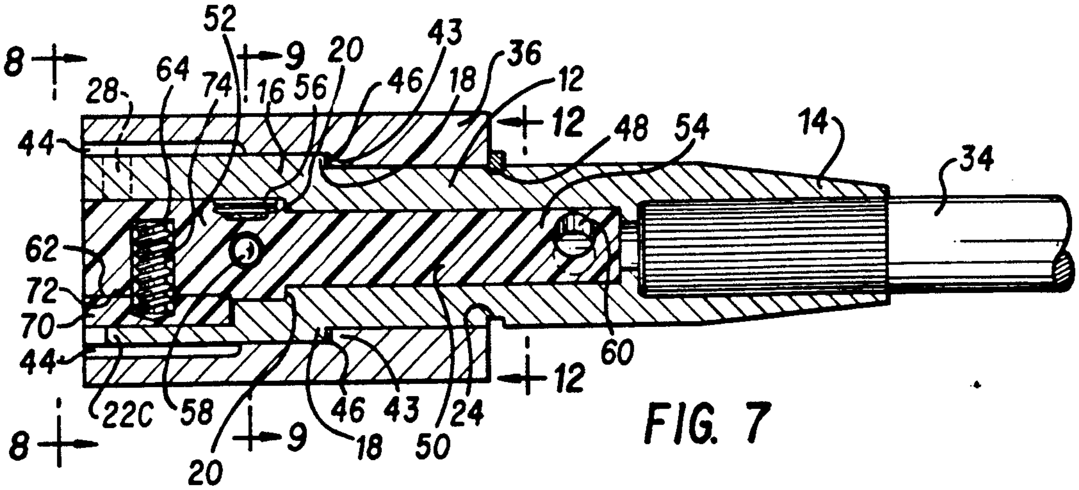
FIG. 7 is a vertical sectional view taken in direction of the arrows and along the plane of line 7—7 in FIG. 6
Figure 8:
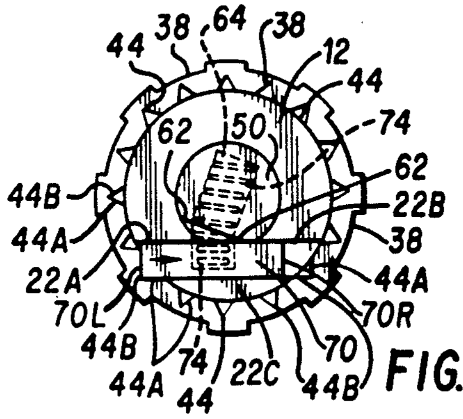
FIG. 8 is an elevational view taken in direction of the arrows and along the plane of line 8—8 in FIG. 7.

A pawl spring 74 as illustrated in FIGS. 7, 8, and 21 is seated in the pawl recess 72 and in the rod recess 64 such that when the switch button 68 rotates the switch rod 50 in a predetermined direction, the pawl spring 74 forces the pawl 70 to shift within the head slot 22 and engage one of the plurality of inwardly facing ratchet teeth 44 of the first cylindrical retainer cavity 40 (see FIG. 8, and FIG. 21).

As best illustrated in FIG. 22 and FIG. 23 for another preferred embodiment of the invention, a pawl recess bearing 106 (preferably a spherical ball) is seated on an end of the pawl spring 74 such as to be biased against one of the sloping recess pawl walls 72*p*, depending on the disposition of the switch rod 50. In FIGS. 22 and 23, pawl spring 74 in addition to being seated in rod recess 64 extends up or into a portion of the bore 102 of neck 100. The bearing 106 extends down into the bore 102 to seat against or into an end of the pawl spring 74. Part of the bearing 106 extends above the neck top 101 such as to be in a position for rotatably engaging the sloping pawl walls 72*p*—72*p*. In this embodiment of the invention, the pawl spring 74 urges, biases, or forces the bearing 106 against one of the sloping pawl walls 72*p* and/or against the recess bottom point 72*bp*. For this embodiment of the invention, the pawl spring 74 does not extend or protrude beyond the rod recess 64 of FIGS. 7, 8, and 21. Thus, as will be more fully explained below, by the pawl spring 74 being entirely seated into the rod recess 64 as illustrated in FIGS. 22 and 23 and not extending beyond the rod recess 64, nor beyond the neck top 101, there will be essentially no lateral stress and/or strain on the structure of the pawl spring 74 when the pawl 70 is being moved or shifted within the formed head slot 22. This improved embodiment of the invention enables the pawl spring 74 to function or operate longer without having to be replaced due to structural distortions or breakage. For the preferred embodiment of the invention in FIGS. 22 and 23, it is the bearing 106 and not the pawl spring 74 that receives lateral stresses and/or strains when switch rod 50 is moved in order to shift and/or move the pawl 70 within the formed head slot 22. Unusual (especially lateral) stresses and/or strains may occur on the bearing 106 (or on the pawl spring 74 for the embodiment of the invention in FIGS. 7, 8, and 21) in the shifting or movement of the pawl 70 should or in the event that the pawl 70 or the head slot 22 (i.e., slot roof 22A and 22B, and slot bottom 22C) contain or is formed with burrs or any other structural flaws that would hinder or retard the free movement of the pawl 70 within the head slot 22. Bearing 106 is structurally more suited for overcoming or meeting these unusual stresses and/or strains than the pawl spring 74 whose structure may be somewhat more fragile than the structure of bearing 106.

Figure 19:
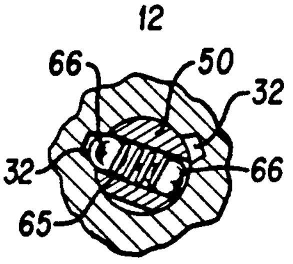
FIG. 19 is a partial vertical sectional view taken in direction of the arrows and along the plane of line 19—19 in FIG. 18.

Simultaneous with the rotation of the switch rod 50 in a predetermined direction, the pair of balls 66—66 is being lodged and/or dislodged from the pair of detent holes 30—30 or from the pair of internal channels 32—32 (see FIGS. 8, 19 and 21). The pawl 70 is capable of being shifted in opposing directions within the formed head slot 22 in accordance with the predetermined rotation of the switch rod 50. The shift of the pawl 70 from one side of the head slot 22 and its engagement with one of the ratchet teeth 44 prevents a rotation of the retainer 36 in one direction as during application of a force simultaneous with freely providing a reverse turn of the retainer 36 in preparation for the exertion of additional force in the prevented direction. A shifting of the pawl 70 to the other side of the head slot 22 in its engagement thereat with one of the ratchet teeth 44 precludes a rotation of the retainer 36 in an opposite direction while freely providing a reverse turn of the retainer 36.

Referring more particularly to FIG. 8, clockwise rotation of the cylindrical retainer 36 is blocked or prevented because pawl 70 is locked, wedged, or the like, between the slot roof 22A and a tooth side 44A of the respective tooth 44. Tooth side 44B of the respective tooth 44 is essentially perpendicular with respect to tooth side 44A and is generally flushed against (and parallel to) the end surface 70L of the pawl 70. Also, when the pawl 70 is in the position as illustrated in FIG. 8, the pawl spring 74 is biasing, forcing, urging, or the like, pawl 70 in two directions; namely a lateral direction in flushing and contacting the end surface 70L of the pawl 70 against the tooth side 44B of the respective tooth 44 and a vertical direction in driving or urging a portion of the underside of the pawl 70 against the tooth side 44A of the same respective tooth 44.

For the improved embodiment of the invention in FIGS. 22-28, the bearing 106 is being biased, forced or urged against one of the sloping pawl walls 72*p* by the pawl spring 74. The combination of the biased bearing 106 and the sloping pawl wall 72*p* also biases or urges the pawl 70 in a lateral direction and in a vertical direction. As illustrated in FIG. 22, lateral urging or biasing of the pawl 70 causes the end surface 70R of the pawl 70 to flush against and contact the tooth side 44A of a respective tooth 44, and vertical urging or biasing drives or urges a portion of the underside of the pawl 70 against the tooth side 44B of the same respective tooth 44. FIG. 23 illustrates the end surface 70L of the pawl 70 being biased and flushed against the tooth side 44B of a respective tooth from the lateral urging and biasing of the pawl 70, and a portion of the underside of the pawl 70 being biased and flushed against the tooth side 44A of the same respective tooth 44 from the vertical urging or biasing. As was indicated, the employment of the biased bearing 106 and a sloping pawl wall 72*p* relieves the pawl spring 74 from unusual stresses and/or strains caused by burrs or other structural flaws. Counter clockwise rotation of the cylindrical retainer 36 is permitted when the pawl 70 is in the position illustrated in FIG. 8, because when the retainer 36 is rotated counter clockwise, the pawl 70 is driven towards the right (i.e. in direction of the arrow that has been labeled on the pawl 70 in FIG. 8) and is released from the respective tooth 44 that it had been engaging, and engages the next tooth 44 that is traveling downwardly and rotating from the counter clockwise direction. The lateral directional force of the pawl spring 74 drives and/or urges the pawl 70 to the left (i.e. in a direction opposed to the direction of the arrow that has been labeled as the pawl 70 in FIG. 8) to engage the next tooth .44 When the cylindrical retainer 36 is being rotated counter clockwise, the surface of the tooth side 44B is acting or defining a cam surface against the end surface 70L of the pawl 70.

For the preferred embodiment of the invention is FIGS. 22–28, counter clockwise rotation of the cylindrical retainer 36 is permitted when the pawl 70 is in the position illustrated in FIG. 23, because when the retainer 36 is rotated counter clockwise, the pawl 70 is driven towards the right (i.e., in direction of the arrow that has been labeled on the pawl 70 in FIG. 23) and is released from the respective tooth 44 that it had been engaging, and engages the next tooth 44 that is traveling downwardly and rotating from the counter clockwise direction. The lateral directional force of the biased bearing 106 drives and/or urges the pawl 70 to the left (i.e., in a direction opposed to the direction of the arrow that has been labeled as the pawl 70 in FIG. 23) to engage the next tooth 44. When the cylindrical retainer 36 is being rotated counter clockwise, the surface of the tooth side 44B is acting or defining a cam surface against the end surface 70L of the pawl 70.

Similarly, when the pawl 70 is in the posture as illustrated in FIG. 21, counter clockwise rotation of the cylindrical retainer 36 is blocked, wedged, or the like, between the slot roof 22B and a tooth side 44B of the respective tooth 44. When the pawl 70 is in this position, tooth side 44A of the respective tooth 44 is essentially perpendicular with respect to tooth side 44B and is generally flushed against (and parallel to) the end surface 70R of the pawl 70. Furthermore, when the pawl 70 is in the position as illustrated in FIG. 21, the pawl spring 74 is biasing, forcing, urging, or the like, the pawl 70 in a lateral direction and in a vertical direction. The force in the lateral direction flushes the end surface 70R of the pawl 70 against the tooth side 44A of the respective tooth 44 and the force in the vertical direction urges a portion of the underside of the pawl 70 against the tooth side 44B of the same respective tooth 44. Clockwise rotation of the cylindrical retainer 36 is permitted when the pawl 70 is in the position illustrated in FIG. 21. As the retainer 36 is rotated clockwise, the pawl 70 is driven towards the left and in direction of the arrow that has been labeled on the pawl 70 in FIG. 21 until it releases from the respective tooth 44 that it had been engaging. After the pawl 70 is released, the lateral directional force of the pawl spring 74 urges or biases the pawl 70 to the right (i.e. in a direction opposed to the direction of the arrow that has been labeled on the pawl 70 in FIG. 21) to engage the next tooth 44 that is traveling downwardly and rotating from the clockwise direction. Similarly to what was seen in FIG. 8, when the cylindrical retainer 36 is being rotated clockwise, the surface of the tooth side 44A is acting or defining a cam surface against the end surface 70R of the pawl 70. In FIG. 8, tooth side 44B is defining the cam surface. Thus, the tooth sides 44A and 44B of the respective teeth 44 provide a cam surface in the shifting and/or the ratcheting of the pawl 70.

Similarly, for the preferred embodiment of the invention in FIGS. 22–28, when the pawl 70 is in the posture as illustrated in FIG. 22, counter clockwise rotation of the cylindrical retainer 36 is blocked, wedged, or the like, between the slot roof 22B and a tooth side 44B of the respective tooth 44. When the pawl 70 is in this position as was seen in FIG. 21, tooth side 44A of the respective tooth 44 is essentially perpendicular with respect to tooth side 44B and is generally flushed against (and parallel to) the end surface 70R of the pawl 70. Furthermore, when the pawl 70 is in the position as illustrated in FIG. 22, the biased bearing 106 is biasing, forcing, urging, or the like, the pawl 70 in a lateral direction and in a vertical direction. The force in the lateral direction flushes the end surface 70R of the pawl 70 against the tooth side 44A of the respective tooth 44 and the force in the vertical direction urges a portion of the underside of the pawl 70 against the tooth side 44B of the same respective tooth 44. As was previously mentioned, bearing 106 is being biased against sloping wall 72*p* by the pawl spring 74. Clockwise rotation of the cylindrical retainer 36 is permitted when the pawl 70 is in the position illustrated in FIG. 22. As the retainer 36 is rotated clockwise, the pawl 70 is driven towards the left and in direction of the arrow that has been labeled on the pawl 70 in FIG. 22 until it releases from the respective tooth 44 that it had been engaging. After the pawl 70 is released, the lateral directional force of the biased bearing 106 urges or biases the pawl 70 to the right (i.e., in a direction opposed to the direction of the arrow that has been labeled on the pawl 70 in FIG. 22) to engage the next tooth 44 that is traveling downwardly and rotating from the clockwise direction. Similarly to what was seen in FIG. 21, when the cylindrical retainer 36 is being rotated clockwise, the surface of the tooth side 44A is defining or acting as a cam surface against the end surface 70R of the pawl 70. In FIG. 21, tooth side 44B is defining the cam surface. Thus, for the embodiment of the invention in FIGS. 22–28, the tooth sides 44A and 44B of the respective teeth 44 provide a cam surface in the shifting and/or the ratcheting of the pawl 70.

Figure 9:
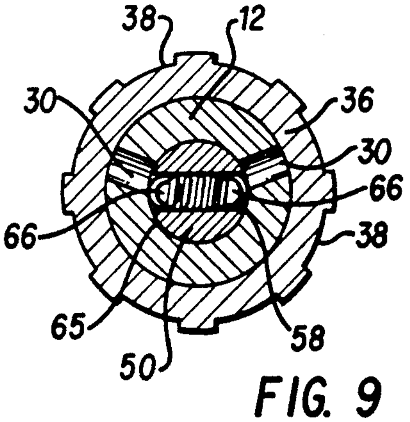
FIG. 9 is a vertical sectional view taken in direction of the arrows and along the plane of line 9—9 in FIG. 7.
Figure 12:
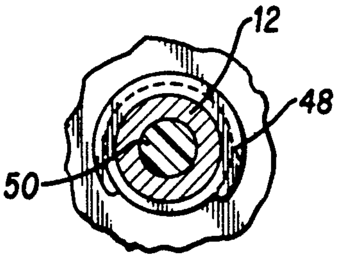
FIG. 12 is a vertical sectional view taken in direction of the arrows and along the plane of line 12'12 in FIG. 7.

In the embodiment of the conduit head 12 having the pair of detent holes 30—30, each of the detent holes 30 has a central axis. When the switch rod 50 is in a neutral position as represented in FIG. 9, radial extension of the detent holes 30—30 represents between about 5° and 35° angle with a horizontal plane along the central axis of the first cylindrical rod hole 58. In a preferred embodiment of the invention, when the switch rod 50 is in the neutral position, the radial extension of the central axis of the detent holes 30—30 defines an about 20° angle with the horizontal plane along the central axis of the first cylindrical rod hole 58.

In the embodiment of the invention wherein the conduit head 12 has a pair of internal channels 32—32 (see FIG. 19) and when the switch rod 50 is in the previously mentioned neutral position, each of the internal channels 32 has a plane along its central vertical axis that represents between about 5° and 35° with a horizontal plane along the central axis of the first cylindrical rod hole 58. Preferably, the plane of the central vertical axis of the internal channel 32 defines an about 20° angle with the horizontal plane along the central axis of the first rod hole 58, when the switch rod 50 is in the neutral position. A non-neutral position of the switch rod 50 is represented in FIGS. 8, 19, and 21.

The ratcheting tool driver 10 of this invention preferably additionally includes the handle 76 positioned around the hollow cylindrical retainer 36 and engaged to the flutes 38. A button cap 78 is situated around the open first end 14 of the conduit head 12 and is engaged to the switch button (see FIG. 1).

With continuing reference to the drawings for the method of assembling the ratchet tool driver 10 and operating the same, the conduit head 12 is formed with the head recess 24, the head opening 26, and with the open first end 14. The conduit head 12 should also include an open second end 16 that includes the external head flange 18, the internal head flange 42, the heat slot 22 which is open on its sides, the loading hole 26, and either with the pair of detent holes 30—30 or the pair of internal channels 32—32, depending on which embodiment of the conduit head 12 is desired. The switch rod 50 is slid through the open second end 16 until the second cylindrical rod hole 58 collimates with the loading hole 28. The rod retention spring 65, opposed by the pair of balls 66—66, is slipped through the loading hole 28 and/or seated in the second cylindrical rod hole 58. By sliding the switch rod 50 further into the open end 16 of the head conduit 12, the pair of balls 66—66 becoming biased by the rod retention spring 64 against the internal wall of the open second end 16 of the conduit head 12 (see FIG. 9). Subsequently for the embodiment of the invention in FIGS. 7, 8, 14, 18, and 21, the pawl spring 74 is seated in the pawl recess 72 and in the rod recess 64 of the channeled side 62 of the switch rod 50; and the pawl 70 is placed toward the channeled side 62 in order to compress the pawl spring 74 simultaneous with continuing to slide the switch rod 50 through the open second end 16 until the second cylindrical rod hole 60 registers with the head opening 26, and until the pawl 70 slidably lodges within the head slot 22. The switch rod 50 is also continued to slide with respect to the conduit head 12 embodiment of FIG. 15, until the pair of balls 66—66 biased by the rod retention spring 65 circumferentially register with the pair of detent holes 30—30. Subsequently for the embodiment of the invention in FIGS. 22-28, the pawl spring 74 is passed through bore 102 of the neck 100 into the rod recess 64, and bearing 106 is seated on the exposed end of the pawl spring 74. Bearing 106 is pushed to compress the pawl spring 74 and bias the bearing 106, and the biased bearing 106 is subsequently seated in the pawl recess 72. Thereafter, pawl 70 for FIGS. 22-28 is disposed toward the neck 100 on the channeled side 62 in order to compress the bearing 106 and the pawl spring 74 while simultaneously continuing to slide the switch rod 50 through the open second end 16 until, as was seen for the embodiment of the invention in FIGS. 7, 8, 14, 18, and 21, the second cylindrical rod hole 60 is aligned with the head opening 26 and the pawl 70 is slidably lodged within the head slot 22. For the embodiment of the invention in FIGS. 22-28, the switch rod 50 is also continued to slide with respect to the conduit head 12 embodiment of FIG. 15, until the pair of balls 66—66 biased by the rod retention spring 65 circumferentially register with the pair of detent holes 30—30.

The washer 46 is flushed circumferentially against the external head flange 18 of the conduit head 12. The hollow cylindrical retainer 36 is rotatably positioned around the open second end 16 of the conduit head 12 from the beginning of the open second end 16 to the head recess 24 (see FIGS. 7 and 18) such that the washer 46 is rotatably sandwiched between external head flange 18 of the internal flange 42. In order to prevent "free wheeling" of the retainer 36 about the open end 16 of the conduit head 12, friction has to be imparted to the washer 46. This is accomplished by positioning the snap ring 48 in the head recess 24. Snap ring 48 positioned in the head recess 24 also functions to maintain the retainer 36 around the open second end 16 of the head conduit 12. The switch button 68 is seated in the second cylindrical rod hole 60 and extends through the head opening 26 to protrude therefrom in order to rotate the switch rod 50 about its central axis within the head conduit 12 in a predetermined direction.

When the switch rod 50 is rotated with the switch button 68 in one predetermined direction, one of the pair of balls 66—66 leaves the neutral position (of FIG. 9) and becomes removably lodged in either one of the pair of detent holes 30—30 or in one of the pair of internal channels 32—32, depending on the embodiment of the conduit head 12 being utilized. Rotation of the switch rod 50 in one predetermined direction simultaneously causes the pawl spring 74 (in FIGS. 7, 8, and 21), or biased bearing 106 (in FIGS. 22 and 23) to force the pawl 70 to shift within the head slot 22 and engage one of the plurality of inwardly facing ratchet teeth 44 of the retainer 36 to prevent rotation of the retainer 36 in one direction simultaneous with freely providing a reverse turn of the retainer 36 (see FIG. 8 and FIG. 21, and FIGS. 22 and 23). When the switch rod 50 is rotated by the switch button 68 in the reverse of the predetermined direction in order to dislodge one of the pair of balls 66—66 from either one of the pair of detent holes 30—30 or one of the pair of internal channels 32—32 (see FIG. 19), the continuing rotation of the switch rod 50 causes the switch rod 50 to go into the neutral position (of FIG. 9) and subsequently with continuing rotation, the other opposed remaining ball 66 of the pair of balls 66—66 becomes lodged in either the other opposed remaining detent holes 30 of the pair of holes 30—30 or in the other opposed remaining internal channel 32 of the pair of internal channels 32—32. This causes the pawl 70 to shift to the other side of the head slot 22 (from that represented in FIG. 8 or FIG. 23) and its engagement thereat with the ratchet teeth 44 and precludes a rotation of the retainer 36 in an opposite direction while freely providing a reverse turn of the retainer 36. When the handle 76 and the button cap 78 are positioned around the retainer 36 and around the open second end 14, and engages the switch button 68, respectively, and when a shaft 34 is inserted into the open second end 14 to be accommodated thereby, the ratcheting tool driver 10 of this invention defines a tool. The tool in a preferred embodiment of the invention is a screw driver.

Thus by the practice of this invention there is provided a ratcheting tool driver 10 which is an improvement over any of the tool drivers disclosed in the prior art. The sinusoidal washer 46 develops friction between the reatiner 36 and the conduit head 12 to prevent the screw driver from "free wheeling" during switching from a closkwise to a counter clockwise direction. The switch rod 50 that is engaged to the switch button 68, provides a rotating action in changing from clockwise to counter clockwise direction of the retainer 36 of the screw driver. The switch rod 50 of this invention is longitudinally positioned to the line of action and the switch driver shaft 34 to provide a means of changing ratchet direction. This position of the switch rod 50 creates a means of providing a rotational motion to change ratchet direction from clockwise to counter clockwise. The sliding pawl 70 of this invention is connected to the switch rod 50 by a spring 74, or by the biased bearing 106 lodged within the pawl recess 72. Spring 74, or the biased bearing 106, provides the necessary spring action to the pawl 70 when the ratchet mechanism is being operated. When the switch rod 50 is retained in an engaged position, the spring 74, or the biased bearing 106 lodged within the pawl recess 72, connect the switch rod 50 with the pawl 70 and performs the work to move the pawl 70 in and out of engagement with the ratchet teeth 74. The formed neck 100 in combination with the bearing 106 being biased against sloping walls *72p*—*72p* by the pawl spring 74 being seated through bore 102 and into recess 64 relieves the pawl spring 74 of any unusual stresses and/or strains that may be caused by structural flaws, such as burns. The teeth sides 44A and 44B define cam surfaces that engages one of the end surfaces, either 70L or 70R, of the pawl 70. The ratcheting tool driver 10 of this invention incorporates the conduit head 12 details from the recess 24 to the open second end 16, in conjunction with incorporating the switch rod 50 and its encased spring 64-balls 66—66, and the pawl 70 assembly including the spring 74, within the confines of the retainer 36. Thus, a much improved ratcheting tool driver 10 and a work tool is provided by this invention.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A method of assembling a ratcheting tool driver comprising the steps of:

a) forming a generally conduit head means with a head recess and a head opening and with an open first end and with an open second end that includes an external head flange, an internal head flange, a head slot which is open on its sides, a loading hole and a pair of detent holes;

b) sliding through said open second end a switch rod means having a first cylindrical rod hole, a second cylindrical rod hole, a channeled side with a rod recess therein and with a hollow neck means disposed integrally in said channeled side around said rod recess, until said first cylindrical rod hole collimates with said loading hole;

c) slipping through said loading hole a rod retention spring bias means with a pair of ball means on opposed sides thereof until said rod retention spring bias means and the pair of opposed positioned ball means are seated into said first cylindrical rod hole;

d) sliding further said switch rod means until said pair of ball means are biased by said rod retention spring bias means against the internal wall of said open second end of said conduit head means;

e) seating a pawl spring bias means through said hollow neck means and in the rod recess of said channeled side of said switch rod means;

f) disposing a bearing means against said pawl spring bias means;

g) seating said bearing means in a pawl recess of a pawl means;

h) pressing said pawl means toward the channeled side in order to compress said pawl spring bias means simultaneously while continuing to slide said switch rod means through said open second end until said second cylindrical rod hole collimates with said head, opening, and said pair of ball means biased by said rod retention spring bias means circumferentially registers with said pair of detent holes until said pawl means slidably lodges within said head slot;

i) flushing circumferentially a washer means against said external head flange;

j) positioning rotatably a hollow cylindrical retainer means with a plurality of inwardly facing ratchet teeth and an internal retainer flange around the open second end of said generally conduit head means from the beginning of said open second ènd to the head recess and such that said washer means is rotatably sandwiched by said external head flange and said internal retainer flange;

k) providing friction to said washer means of step (h) in conjunction with maintaining said retainer means around said open second end by positioning a snap ring means in said head recess; and l) seating a switch button means in said second cylindrical rod hole and extending through said head opening of said head means in order to rotate the switch rod means about its central axis within said head means in a predetermined direction.

2. The process of claim 1 wherein the first cylindrical rod hole has a central axis that is generally parallel to a plane of the face of the channeled side.

3. The process of claim 1 additionally comprising rotating said switch rod means with said switch button means in one predetermined direction until one of the pair of ball means removably lodges in one of said pair of detent holes and causing simultaneously said bearing means to force the pawl means to shift within said head slot and engage one of the plurality of inwardly facing ratchet teeth of the retainer means to prevent a rotation of the retainer means in one direction simultaneously while freely providing a reverse turn of the retainer means.

4. The process of claim 3 additionally comprising rotating the switch rod means with said switch button means in the reverse of said predetermined direction to dislodge said one of said pair of ball means from one of said pair of detent holes and continuing to rotate said switch rod means with said switch button means until the other opposed remaining ball means of said pair of ball means becomes lodged in the other opposed remaining detent hole of said pair of detent holes and causing said pawl means to shift to the other side of the head slot and its engagement thereat with the ratchet teeth and precluding a rotation of the retainer means in an opposite direction while freely providing a reverse turn of said retainer means.

5. The process of claim 1 additionally comprising inserting a shaft means into said open first end such that said ratcheting tool driver defines a tool.

6. The process of claim 1 wherein said washer means of step (g) has a sinusoidal structure.

7. The process of claim 1 wherein each of said detent holes has a central axis and said sliding step (d) is until said first cylindrical rod hole registers circumferential with said pair of detent holes and until the radial extension of each of the central axis of the detent holes represents between about 5° and 35° angle with a horizontal plane along the central axis of the first cylindrical rod hole.

8. The process of claim 1 wherein said loading hole includes a larger diameter than the diameter of the pair of detent holes.

9. The process of claim 1 additionally comprising positioning a handle means around the hollow cylindrical retainer means and positioning a button cap means around the open first end and engaging the switch button means.

10. The process of claim 1 wherein the first cylindrical rod hole has a central axis that is generally parallel to a plane of the face of the channeled side;

said process additionally comprising rotating said switch rod means with said switch button means in one predetermined direction until one of the pair of ball means removably lodges in one of said pair of detent holes and causing simultaneously said bearing means to force the pawl means to shift within said head slot and engage one of the plurality of inwardly facing ratchet teeth of the retainer means to prevent a rotation of the retainer means in one direction simultaneously with freely providing a reverse turn of the retainer means, and subsequently rotating the switch rod means with said switch button means in the reverse of said predetermined direction to dislodge said one of said pair of ball means from said one of said pair of detent holes and continuing to rotate said switch rod means with said switch button means until the other opposed remaining ball means of said pair of ball means becomes lodged in the other opposed remaining detent hole and causing said pawl means to shift to the other side of the head slot and its engagement thereat with the ratchet teeth and precluding a rotation of the retainer means in an opposite direction while freely providing a reverse turn of said retainer means;

inserting a shaft means into said open first end such that said ratcheting tool driver defines a tool, said washer means of said step (g) has a sinusoidal structure;

each of said detent holes has a central axis and said sliding step (d) is until said first cylindrical rod hole registers circumferential with said pair of detent holes and until the radial extension of each of the central axis of the detent holes represents between about 5° and 35° angle with a horizontal plane along the central axis of the first cylindrical rod hole;

said loading hole includes a larger diameter that the diameter of the pair of detent holes; and additionally comprising positioning a handle means around the hollow cylindrical retainer means and positioning a button cap means around the open first end engaging the switch button means.

11. A method of assembling a ratcheting tool driver comprising the steps of:

a) forming a generally conduit head means with a head recess and a head opening and with an open first end to accomodate a tool and with an open second end that includes an external head flange, an internal head flange, a head slot which is open on its sides, a loading hole and a pair of internal channels;

b) sliding through said open second end a switch rod means having a first cylindrical rod hole, a second cylindrical rod hole, a channeled side with a rod recess therein and with a hollow neck means disposed integrally on said channeled side around said rod recess, until said first cylindrical rod hole collimates with said loading hole;

c) slipping through said loading hole a rod retention spring bias means with a pair of ball means on opposed sides thereof until said rod retention spring bias means and the pair of opposed position ball means are seated into said first cylindrical rod hole;

d) sliding further said switch rod means until said pair of ball means are biased by said rod retention spring bias means against the internal wall of said open second end of said conduit head means;

e) seating a pawl spring bias means in the rod recess of said channeled side of said switch rod means;

f) disposing a bearing means against said pawl spring bias means;

g) seating said bearing means in a pawl recess of a pawl means;

h) pressing said .pawl means toward the channeled side in order to compress said pawl spring bias means simultaneously while continuing to slide said switch rod means through said open second end until said second cylindrical rod hole collimates with said head opening, and said pawl means slidably lodges within said head slot;

i) flushing circumferentially a washer means against said external head flange;

j) positioning rotatably a hollow cylindrical retainer means with a plurality of inwardly facing ratchet teeth and an internal retainer flange around the open second end of said generally conduit head means from the beginning of said open second end to the head recess and such that said washer means is rotatably sandwiched by said external head flange and said internal retainer flange;

k) providing friction to said washer means of step (h) in conjunction with maintaining said retainer means around said open second end by positioning a snap ring means in said head recess; and l) seating a switch button means in said second cylindrical rod hole and extending through said head opening of said head means in order to rotate the switch rod means about its central axis within said head means in a predetermined direction.

12. The process of claim 11 wherein the first cylindrical rod hole has a central axis that is generally parallel to a plane of the face of the channeled side.

13. The process of claim 11 additionally comprising rotating said switch rod means with said switch button means in one predetermined direction until one of the pair of ball means removably lodges in one of said pair of internal channels and causing simultaneously said bearing means to force the pawl means to shift within said head slot and engage one of the plurality of inwardly facing ratchet teeth of the retainer means to prevent a rotation of the retainer means in one direction simultaneously while freely providing a reverse turn of the retainer means.

14. The process of claim 13 additionally comprising rotating the switch rod means with said switch button means in the reverse of said predetermined direction to dislodge said one of said pair of ball means from said one of said pair of internal channels and continuing to rotate said switch rod means with said switch button means until the other opposed remaining ball means of said pair of ball means becomes lodged in the other opposed remaining internal channel of said pair of internal channels causing said pawl means to shift to the other side of the head slot and its engagement thereat with the ratchet teeth and precluding a rotation of the retainer means in an opposite direction while freely providing a reverse turn of said retainer means.

15. The process of claim 11 additionally comprising inserting a shaft means into said open first end such that said ratcheting tool driver defines a tool.

16. The process of claim 11 wherein said washer means of said step (g) has a sinusoidal structure.

17. The process of claim 11 wherein each of said internal channels has a plane along its central vertical axis and said sliding step (d) is until the plane of the central vertical axis of the internal channels represents between about 5° and 35° angle with a horizontal plane along the central axis of the first cylindrical rod hole.

18. The process of claim 11 additionally comprising positioning a handle means around the hollow cylindrical retainer means and positioning a button cap means around the open first end and engaging the switch button means.

19. The process of claim 11 wherein the first cylindrical rod hole has a central axis that is generally parallel to a plane of the face of the side;

said process additionally comprising rotating said switch rod means with said switch button means in one predetermined direction until one, of pair of ball means removably lodges in one of said pair of channels and causing simultaneously said bearing means force the pawl means to shift within said head slot and engage one of the plurality of inwardly facing ratchet teeth of the retainer means to prevent a rotation of the retainer means in one direction simultaneously with freely providing a reverse turn of the retainer means, and subsequently rotating the switch rod means with said switch button means in the reverse of said predetermined direction to dislodge said one of said pair of ball means from said one of said pair of internal channels and continuing to rotate said switch rod means with said switch button means in the reverse of said predetermined direction to dislodge said one of said pair of ball means from said one of said pair of internal channels and continuing to rotate said switch rod means with said switch button means until the other opposed remaining ball means of said pair of ball means becomes lodged into the other opposed remaining internal channel of said pair of internal channels and causing said pawl means to shift to the other side of the head slot and its engagement thereat with the ratchet teeth and precluding a rotation of the retainer means in an opposite direction while freely providing a reverse turn of said retainer means;

inserting a shaft means into said open first end such that said ratcheting tool driver defines a tool;

said washer means of said step (g) has a sinusoidal structure;

each of said internal channels has a plane along its central vertical axis and said sliding step (d) is until the plane of the central vertical axis of the internal channels represents between about 5° and 35° angle with a horizontal plane along the central axis of the first cylindrical rod hole;

and the process additionally comprises positioning a handle means around the hollow cylindrical retainer means and positioning a button cap means around the open first end and engaging the switch button means.

* * * * *